May 2, 1933.
C. E. SUMMERS
PLATED PISTON
Re. 18,814
Original Filed Aug. 15, 1930
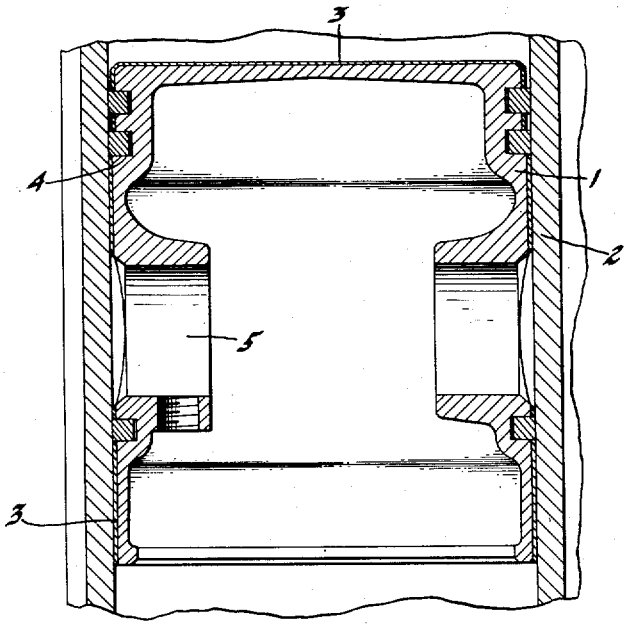
Inventor
Caleb E. Summers
By Blackwood, Spencer & Hirt
Attorneys Reissued May 2, 1933 Re. 18,814

UNITED STATES PATENT OFFICE

CALEB E. SUMMERS, OF PONTIAC, MICHIGAN, ASSIGNOR TO GENERAL MOTORS CORPORATION, OF DETROIT, MICHIGAN, A CORPORATION OF DELAWARE

PLATED PISTON

Original No. 1,856,272, dated May 3, 1932, Serial No. 474,935, filed August 13, 1930. Application for reissue filed September 21, 1932. Serial No. 634,212.

This invention relates to bearing surfaces for the contacting areas of cylinders and pistons, especially those of internal combustion engines, and includes, specifically, the application to the contacting areas of the cylinder or piston a relatively thin coating of a metal softer than the portions of the piston and cylinder which would otherwise normally engage.

It is well known that, in commercial practice, cylinders are seldom perfectly round, and, even if made so, they become more or less distorted by the temperature changes which they undergo. Pistons are also subject to similar defects and are even more liable to distortion by temperature changes because the head portion normally reaches a temperature several hundred degrees higher than the lower part of the skirt. It is therefore not feasible to produce commercially a piston that will fit the cylinded bore when cold and not be so tight as to cause "seizing" or "scoring" when hot.

In order to secure a fit sufficiently close for operative efficiency, it is customary to assemble pistons in the cylinders with a closer fit than is possible for full speed operation and then operate the engine at low speed until the pistons have been "run in" by actual wear to a degree of looseness permitting full speed.

In accordance with the present invention I obviate, to a considerable extent, the difficulties hitherto encountered by applying to one of the surfaces to be engaged a thin coating of a metal sufficiently soft and plastic to permit the coating to give way readily should the piston tend to seize. The coating is preferably so thin that it constitutes, in itself, no considerable body of metal and therefore does not assume the burden of maintaining the piston shape under the pressures and impacts incident to piston operation. The preferred thickness is in the neighborhood of only a thousandth of an inch although, of course, the thickness may be varied within the scope of the invention within limits measured in thousandths of an inch.

The metal employed for the coating should be such as will provide a suitable bearing material for the metal of the other engaging surface. With pistons and cylinders of cast iron or other ferrous metal, soft and plastic metals such as copper, lead and tin may be mentioned as suitable. I prefer tin, however, and have found it to give satisfactory results. Notwithstanding its low melting point, it adheres strongly and wears comparably to the iron. I have found that tin, or alloys thereof having characteristics determined by the presence of the tin, are particularly suitable for sliding engagement with ferrous metal surfaces because of their low coefficient of friction and resultant high degree of antifriction qualities as bearing metals. This property is found to be a characteristic also of lead and of some other metals and alloys thereof, for example, silver and cadmium.

The soft metal may be applied in any manner adapted to produce a coating of the thinness and evenness desired. A process of electro-deposition is preferred, such process enabling a very uniform coating to be applied to the entire bearing surfaces.

In the accompanying drawing, I have illustrated the application of the invention to an engine in which the bearing surfaces of the piston are coated with a softer metal. Referring to the drawing, 1 indicates a piston which may be of conventional character so far as shape and material are concerned, being preferably of cast iron. The walls of the cylinder are indicated at 2 and the soft metal coating at 3.

In applying the coating to the piston it may be most convenient to coat the entire exterior of the piston after which, if desired, the coating may be removed from the ring grooves 4 by a finishing cut and from the piston pin bearings 5 by reaming.

In the use of pistons plated in accordance with the present invention, by making the iron portion of the piston sufficiently small so that there is no danger of scoring and then applying sufficient tin so that the piston enters the bore with a clearance of only .0005 to .0015 inch, I have found it possible to operate the engine immediately at practically full power and speed. At points where there may be undue pressure the soft metal seems to give way at once and the proper clearance at all points is automatically generated.

In addition to the shortening of the slow-speed "running in" period, by reason of the ease with which the coating forms itself to the bore, the invention permits of a tighter initial fit thereby lengthening the useful life of the piston. It also provides means whereby pistons that have become worn or are initially undersize may be fitted to the cylinder and whereby oversize pistons may be produced to fit worn or oversize cylinders. It also enables pistons and cylinders to be assembled with much less exact fitting and finish than has hitherto been required while at the same time preventing seizing or scoring. Furthermore, the soft metal apparently fills the pores of the cast iron of the cylinder thereby rendering the surface smoother than it would otherwise be.

As an example of actual practice in the automobile industry, the following procedure is given: Pistons of cast iron for cast iron cylinders of 3¼ to 3½ inches bore are ground to such diameter that they will enter the cylinder with a clearance of three thousandths of an inch, or one and one-half thousandths on a side. This was the standard clearance for such pistons before adoption of coating with soft metal. In accordance with the present invention, the pistons are then coated with tin to a thickness of three quarters of a thousandth leaving the final clearance one and one-half thousandths of an inch as compared with the standard practice previously of three thousandths. The ring grooves are then turned and the head of the piston ground, leaving the plastic metal coating on the sides where the piston engages the cylinder.

Pistons so treated form themselves to the cylinder under operating conditions, the plastic metal accommodating itself to the slight and unavoidable irregularities of the conjugate surfaces. At the same time, notwithstanding the closer fit, the danger of seizure or "sticking up" of the pistons is practically eliminated as the plastic metal will yield at points of highest pressure before sufficient heat and pressure are developed to cause the piston to seize.

It has been proposed, heretofore, to provide a piston with relatively thick bands or rings of Babbitt metal bearing upon the cylinder surface. Such construction, however, would not offer the advantages found in the present invention since the soft metal bands receive the full pressure and impact incident to engine operation and are subject to distortion, overheating and rapid wear. A coating of only a few thousandths of an inch applied to the cast iron of the piston skirt, in addition to have the advantages pointed out above, differs from the prior suggested practice in that the very thin coating is unaffected by high temperatures and is rigidly and directly backed up and supported by the piston body so that no material change in form of the bearing surface takes place except as a result of the "running in" process or subsequent normal wear. It also provides a more extended bearing surface than even the cast iron alone would have so that the load is taken by an oil film over a greater area thereby distributing the friction which would otherwise result from concentrated loads where the cast iron contacts on relatively small areas.

I claim:

1. The combination with a cylinder and piston having cooperating surfaces of ferrous metal of a coating integrally united with one of said surfaces consisting of a thin layer of a metal of high anti-friction bearing qualities and sufficiently plastic to yield at the areas of greater pressure during the operation of the parts to thereby prevent seizing of the piston.

2. Structure as set forth in claim 1, said coating being predominantly of tin.

3. A piston for internal combustion engines comprising a body portion of ferrous metal having on the surfaces designed to contact with the cylinder wall an integrally joined thin coating of relatively soft metal of high anti-friction bearing qualities and sufficiently plastic to yield at pressures at which the piston would tend to seize.

4. Structure as set forth in claim 3, said coating being of electrolytically deposited tin.

5. The combination with a cylinder and piston having cooperating surfaces of ferrous metal, said piston fitted to said cylinder with usual clearance, of a coating of relatively soft metal integrally joined to the wearing surface of said piston, said coating being of sufficient thickness to reduce the clearance to approximately one and one-half thousandths of an inch.

6. Structure as set forth in claim 5, the coating being of electrolytically deposited tin.

7. A piston for internal combustion engines comprising a cast iron body and a coating of tin on the cylinder-engaging surfaces of said body, said coating being of less than five thousandths of an inch in thickness.

8. The combination with a cylinder and piston having cooperating surfaces of relatively hard metal of a character subject to seizing and scoring due to temperature changes, of a coating integrally united with one of said surfaces consisting of a thin layer of metal of high anti-friction bearing qualities and sufficiently plastic to yield at the areas of greater pressure during the operation of the parts to thereby prevent seizing of the piston in the cylinder.

9. A piston comprising a body portion of relatively hard metal having on the surfaces designed to contact with the cylinder wall an integrally joined thin coating of relatively soft metal of high anti-friction bearing qualities and sufficiently plastic to yield at pressures at which the piston would tend to seize.

10. A piston for internal combustion engines comprising a relatively hard metal body and a coating of tin on the cylinder-engaging surfaces of said body, said coating being of less than five thousandths of an inch in thickness.

In testimony whereof I affix my signature.

CALEB E. SUMMERS.